United States Patent [19]

Jaw

[11] Patent Number: 5,163,286
[45] Date of Patent: Nov. 17, 1992

[54] GAS TURBINE ENGINE WITH FREE TURBINE INLET FLOW CONTROL

[75] Inventor: Link C. Jaw, Tempe, Ariz.

[73] Assignee: Allied-Signal Inc., Morris Township, Morris County, N.J.

[21] Appl. No.: 660,500

[22] Filed: Feb. 25, 1991

[51] Int. Cl.⁵ .............................................. F02C 9/18
[52] U.S. Cl. ..................................... 60/39.17; 60/39.2
[58] Field of Search ............... 60/39.15, 39.161, 39.17, 60/39.25, 229, 39.2

[56] References Cited

U.S. PATENT DOCUMENTS

| | | | |
|---|---|---|---|
| 2,529,973 | 11/1950 | Sedille et al. | 60/39.161 |
| 3,216,712 | 11/1965 | Dunkak | 60/39.17 |
| 3,255,586 | 6/1966 | Hennig et al. | 60/39.17 |
| 3,283,497 | 11/1966 | Kaplan | 60/39.17 |

*Primary Examiner*—Louis J. Casaregola
*Attorney, Agent, or Firm*—Jerry J. Holden; James W. McFarland; Robert A. Walsh

[57] ABSTRACT

A gas turbine engine comprised of a gas generator in flow series arrangement with a free turbine is provided, that includes a bleed port disposed between the gas generator and the free turbine. The flow of hot gas through the free turbine is controlled by a valve operably disposed in a duct downstream of the bleed port. The gas turbine engine can rapidly change its power output by first bleeding a portion of the hot gas exiting the gas generator overboard, and then increasing or decreasing the amount of bleed flow, thereby producing rapid changes in the free turbine's output.

2 Claims, 1 Drawing Sheet

GAS TURBINE ENGINE WITH FREE TURBINE INLET FLOW CONTROL

TECHNICAL FIELD

This invention relates generally to gas turbine engines and more particularly to a gas turbine engine comprised of a gas generator, a free turbine, and a bleed port disposed therebetween. Through a sequence of steps the gas turbine can rapidly change its power output by controlling the mass flow rate of hot gas in the bleed port.

BACKGROUND OF THE INVENTION

A turboshaft engine is a gas turbine engine comprised, in flow series arrangement, of a gas generator which extracts energy from fuel and produces pressurized hot gas, and a free turbine. The free turbine extracts a portion of the energy of the hot gas and converts this energy into mechanical power in the form of a rotating shaft. Because the free turbine is not mechanically coupled to the the gas generator its shaft is free to rotate at slower speeds, and therefore can be used to drive a propeller. The gas generator includes a compressor, a combustor, and a turbine coupled to the compressor via a shaft.

Turboshaft engines have been successfully used as power plants for driving the rotor blades of helicopters. Sometimes, helicopters are required to fly various low altitude missions that demand large, rapid changes in power from their turboshaft engine. One such mission is terrain avoidance when flying very close to the ground. Another mission is called masking/unmasking. In this mission the helicopter is initially hovering hidden behind an object, then it requires a rapid increase in power to quickly rise above the object to reconnoiter or launch a weapon followed by an equally rapid decrease in power to quickly descend to safety behind the object. Helicopters, like fixed wing aircraft, also fly missions necessitating steep dives and climbs. Consequently, thee has developed a need, especially in military helicopters, for a turboshaft engine that can rapidly change its power output.

One approach to rapidly change the power output of a turboshaft engine is to move the engine's throttle. For example, as the throttle is pushed forward, to its minimum position, the fuel flow to the engine increases resulting in increasing power output. The speed or rate at which the power increases is related to the speed or rate at which the fuel flow increases. However, the speed or rate at which the fuel flow increases is limited by a number of factors including combustor delay, overheating of the turbine blades, compressor stall, and lag due to mass inertia in accelerating the engine's roating components.

Another approach to this problem is to incorporate rotatable vanes at the inlet of either the compressor or the turbine. The disadvantages of these vanes are that they add add considerable weight to the aircraft and require complicated actuation devices.

Accordingly, a need exists for a turboshaft engine that can rapidly change its power output without andy of the previously mentioned disadvantages or limitations.

SUMMARY OF THE INVENTION

An object of the present invention is to provide a turboshaft engine that can change it power output at a faster rate than can be achieved by moving the engine's throttle.

Another object of the present invention is to provide a turboshaft engine that can rapidly change its power output without requiring complex and heavy actuation devices.

Yet another object of the present invention is to provide turboshaft engine that can rapidly change its power output without exposing the turbine blades to damaging temperatures, driving the compressor into stall, or effecting the gas generator operation.

yet still another object of the present invention is to provide a method for rapidly changing the power output of a turboshaft engine.

The present invention achieves the above-stated objects by providing a turboshaft engines with a bleed port upstream to the free turbine. The amount of hot gas bled through this port is controlled by a valve. Prior to initiating a low altitude maneuver, for example, the pilot moves the throttle to a higher setting and partly opens the bleed valve so that a portion of the hot has that would normally flow of the free turbine is extracted and bled overboard without altering the power output of the engine. When a rapid change in power is required a signal from the cockpit either closes the bleed valve resulting in an almost instantaneous increase of hot gas flow to the free turbine and the consequent rapid increase in power output, or opens the valve further producing an almost instantaneous decrease in power. Because the bleed valve is downstream of the gas generator, opening or closing the valve does not significantly affect the operation of the gas generator.

These and other objects, features and advantages of the present invention are specifically set forth in or will become apparent form the following detailed description of a preferred embodiment of the invention when read in conjunction with the accompanying drawing.

DESCRIPTION OF THE PREFERRED EMBODIMENT

Figure 1:
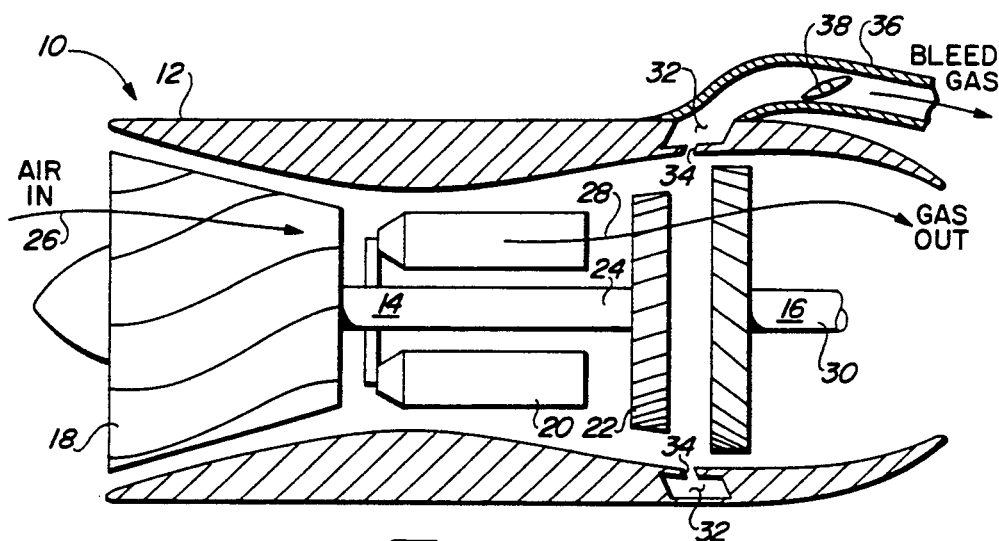
FIG. 1 is a partially schematic, cross-sectional diagram of a turboshaft engine contemplated by the present invention.

A turboshaft engine generally denoted by the numeral 10 is comprised of a casing 12 circumscribing a gas generator 14 and a free turbine 16. The gas generator 14 includes, air flow series arrangement, a compressor to the compressor 18 via a rotating shaft or spool 24. Air 216 entering the engine is pressurized in the compressor 18, and then mixed with fuel and ignited in the combustor 20 to form a hot, pressurized gas 28. This gas is then partly expanded across the turbine 22 to supply the work required to drive the compressor 18. The gas exiting the turbine 12 is further expanded across the free turbine 16, which extracts the remaining pressure energy from the hot gas 28 and converts it to mechanical power in the form of a rotating shaft 30. Because the free turbine 16 is not mechanically coupled to the gas generator 14, it is free to rotate at slower speeds and therefore, it can be used to drive a propeller or rotor through a gearbox, (not shown).

Intermediate the turbine 22 and the free turbine 6, the casing 12 has a plenum 32. A plurality of holes 34 are circumstantially distributed about the interior surface of the casing 12. A portion of the hot gas 28 flows through the holes 34 and into the plenum 32. Preferably, the holes 34 are sized to pass a maximum of about 8% of the hot gas 28 exiting the gas generator 14. Mounted to the casing 12 is a duct 36 which is in fluid communication with the plenum 32. Disposed within the duct 36 is a valve 38 that controls the amount of hot gas flowing therethrough. The valve 38 can be selected from numerous valve types such as a solenoid type valve or a metering type valve. Alternately, to improve flow control accuracy, a plurality of valves 38 can be disposed in a parallel arrangement within the duct 36.

In operation, prior to entering a low altitude mission, the pilot operates the gas generator 14 at a higher throttle setting, and opens the bleed valve 38 so that a portion of the hot gas 28 that normally flows to the free turbine 16 is extracted and bled overboard. When a rapid change in power is required, a signal from the cockpit closes or opens the bleed valve 38 resulting in an almost instantaneous change of hot gas flow 28 to the free turbine 16 and the consequent rapid change in power output, without requiring any significant change or adjustment to the operation of the gas generator 14.

Figure 2:
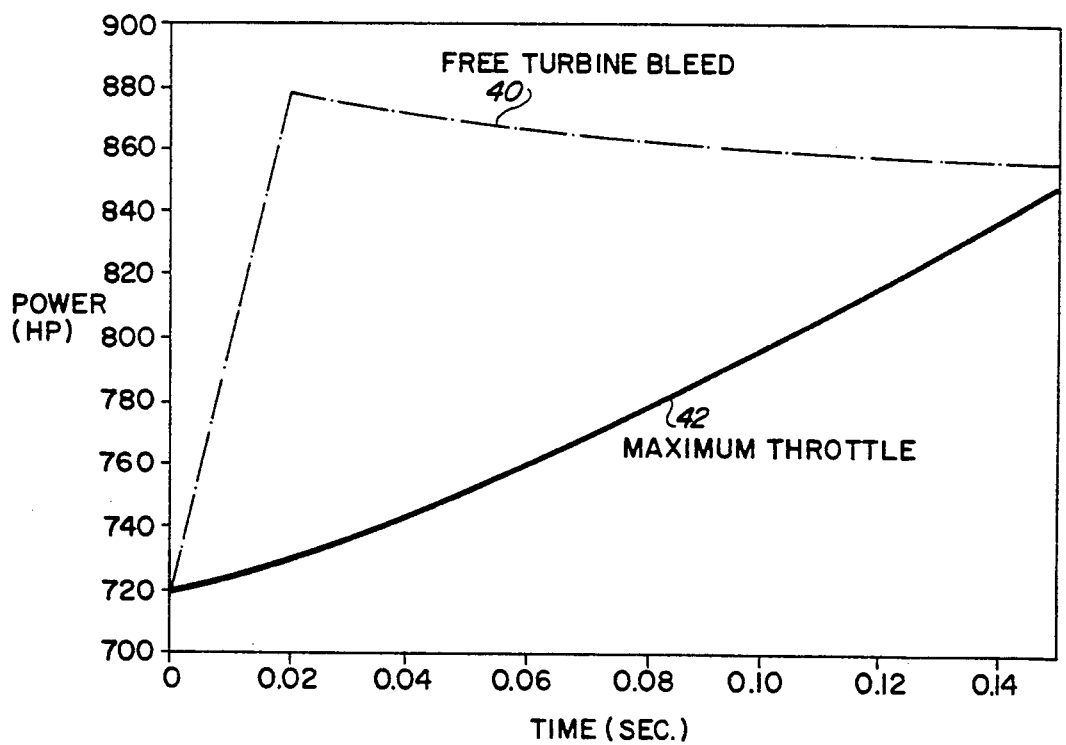
FIG. 2 is a curve of engine power vs. time showing the characteristic for both maximum throttle operation and free turbine bleed operation.

The advantage of the present invention is graphically illustrated in FIG. 2. FIG. 2 is a graph generated by a computer model, that shows engine power vs. time. Curve 40 shows the increase in power produced by closing the valve 38 so that the flow of hot gas to the free turbine is increased by about 8%. The curve 40 shows that in about 0.02 seconds the power output of the engine has been increased by about 160 horsepower. In comparison, curve 42, shows the increase in engine power that results from moving the engine's throttle to its maximum position. As can be seen from curve 42 an increase of about 130 horsepower takes about 0.15 seconds. Thus by employing the present invention, much faster changes in engine power can be attained.

Various modifications and alterations to the above described system will be apparent to those skilled in the art. Accordingly, the foregoing detailed description of the preferred embodiment of the invention should be considered exemplary in nature and not as limiting to the scope and spirit of the invention as set forth in the following claims.

What is claimed is:

1. A gas turbine engine comprising in combination:
   a gas generator for producing hot, pressurized gas;
   a free turbine, disposed to receive said hot, pressurized gas, for converting the energy in said gas into mechanical power;
   a bleed pot located between said gas generator and said free turbine;
   a valve downstream of said bleed pot for controlling the amount of hot gas flowing through said bleed port; and
   a casing circumscribing said gas generator and aid free turbine and defining a plenum, said bleed pot having a plurality of circumstantially distributed holes in said casing which open into said plenum, and a duct for exhausting said hot, pressurized gas, said valve disposed in aid duct whereby by operating said valve a rapid change in said mechanical power is obtained.

2. A gas turbine engine comprising in combination:
   a gas generator for producing hot, pressurized gas;
   a free turbine, disposed to receive said hot, pressurized gas, for converting the energy in said gas into mechanical power;
   a bleed port located between said gas generator and said free turbine;
   a valve downstream of said bleed port for controlling the amount of hot gas flowing through said bleed port; and
   a casing circumscribing said gas generator and said free turbine and defining a plenum, said bleed port having a plurality of circumstantially distributed holes in said casing which open into said plenum, and a duct for exhausting said hot, pressurized gas, said valve disposed in said duct;
   wherein said holes are configured to pass about 8% of said hot, pressurized gas.

* * * * *

UNITED STATES PATENT AND TRADEMARK OFFICE
CERTIFICATE OF CORRECTION

PATENT NO. : 5,163,286
DATED : NOVEMBER 17, 1992
INVENTOR(S) : LINK CHING JAW

It is certified that error appears in the above-identified patent and that said Letters Patent is hereby corrected as shown below:

COLUMN 1, LINE 62, PLEASE REPLACE "ANDY" WITH --ANY--.

COLUMN 2, LINE 56, PLEASE REPLACE "216" WITH --26--.

CLAIMS:

Col. 4, line 16, "aid" should read --said--.

Col. 4, claim 1, lines 11, 13 and 17, "pot" should read --port--

Col. 4, claim 1, line 18, "circumstantially" should read
--CIRCUMFERENTIALLY--.

Col. 4, claim 1, line 21, "aid" should read --said--

Col. 4, claim 2, line 36, "circumstantially" should read
--CIRCUMFERENTIALLY--.

Signed and Sealed this

Sixteenth Day of November, 1993

Attest:

BRUCE LEHMAN

*Attesting Officer*

*Commissioner of Patents and Trademarks*